Sept. 17, 1968         J C. BIRDWELL         3,401,602

PRESSURE FLUID OPERATED MOTOR OR THE LIKE

Filed June 9, 1965         2 Sheets-Sheet 1

INVENTOR.
J.C. Birdwell

United States Patent Office 3,401,602
Patented Sept. 17, 1968

3,401,602
PRESSURE FLUID OPERATED MOTOR
OR THE LIKE
J. C. Birdwell, 8535 Glencrest,
Houston, Tex. 77017
Filed June 9, 1965, Ser. No. 462,518
3 Claims. (Cl. 91—56)

ABSTRACT OF THE DISCLOSURE

A pressure fluid apparatus, alternatively operable as a motor or a pump, employing a rotor mounted for rotation about its own axis and for orbital movement relative to the axis of an enclosing housing, rotatable pressure fluid chambers which function as means for driving the rotor in response to pressure fluid action therein, or alternatively as means driven by the rotor for pumping fluid through the chambers, and having valving means including two co-operating valve plates which function as means for regulating the fluid flow through the pressure fluid chambers.

---

This invention relates to pressure fluid apparatus and more particularly to a pressure fluid motor of the crescent gear type which may also be operated as a fluid pump.

The invention has for an important object the provision of a fluid pressure operated motor, or the like, embodying a hollow housing or stator within which a rotor is mounted for rotation on an axis which is movable orbitally relative to the housing and having means for imparting such rotation and orbital movement to the rotor in response to the flow of pressure fluid into and out of the housing and means for transmitting such rotational or orbital movement of the rotor to an object to be rotated.

Another object of the invention is to provide a pressure fluid motor, or the like embodying a housing having internal gear teeth and a rotor mounted in the housing for rotation about an axis which is movable orbitally relative to the axis of the housing and having external gear teeth disposed in intermeshing engagement with the internal teeth of the housing to cause rotation of the rotor on its axis during such orbital movement of the rotor and including pressure fluid means for rotating the rotor.

A further object of the invention is the provision of a pressure fluid motor, or pump, embodying a housing and a rotor mounted therein for rotation about an axis which is orbitally movable about the axis of the housing, and including a crescent member located between the housing and rotor positioned for coaction with the rotor and positioned with the housing and rotor to form compartments into and out of which pressure fluid may flow to impart rotational or orbital movement to the rotor.

Another object of the invention is the provision of a pressure fluid device for transmitting rotational motion therethru, for applications in steering systems of vehicles, or the like, which will permit transmission of rotational motion therethru with or without pressure fluid application.

A further object of the invention is the provision of a pressure fluid motor or pump which is of compact design and rugged construction and which is easily assembled and disassembled.

The above and other objects and advantages of the invention will be apparent from the following detailed description of preferred embodiment of the same, reference being had to the annexed drawings, wherein—

Figure 1:
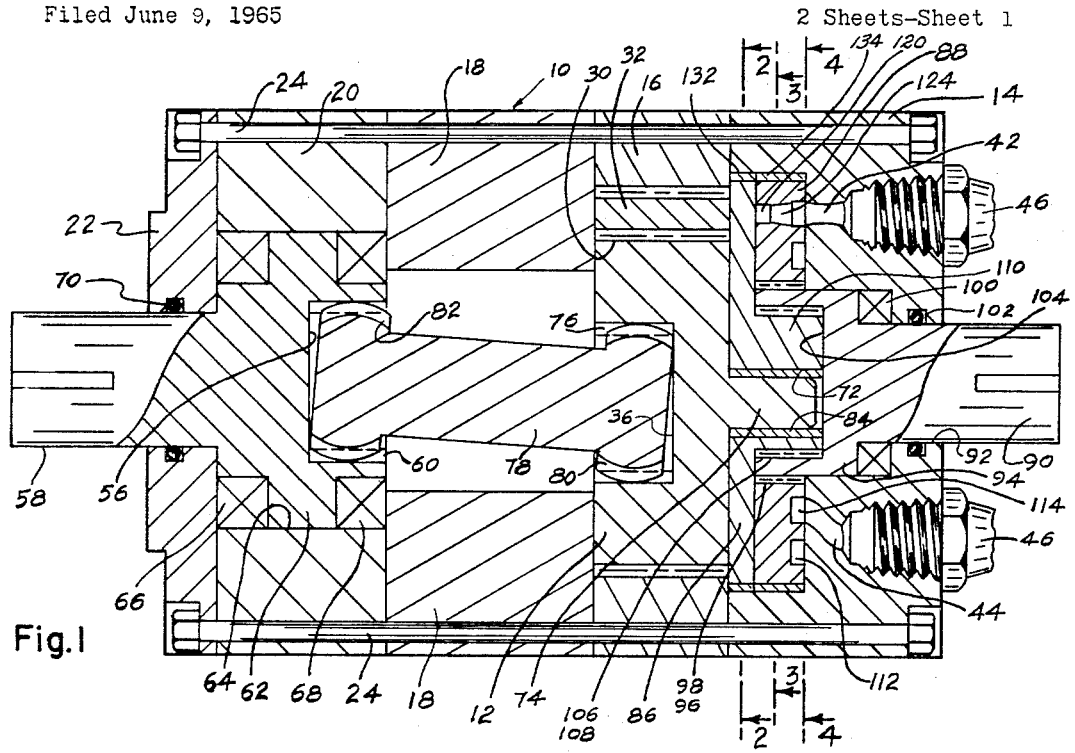
FIGURE 1 is a side view, partly broken away and partly in longitudinal, central, cross-section, illustrating a preferred embodiment of the invention.

As illustrated in FIGURES 1 to 4, inclusive, the fluid pressure apparatus includes an outer, cylindrical housing or stator, generally designated 10, within which a rotor 12 is rotatably mounted for rotation on an axis located centrally of the rotor and for orbital movement about the central axis of the housing. The housing 10 is made up of a number of parts including a valve head or block 14, an internal ring gear 16, spacer ring 18, bearing block 20, and mounting plate 22, which parts are suitably perforated for the extension therethrough of securing bolts 24, by which the parts are held in assembled relation.

Within the valve head 14 annular valve plates 86 and 88 are rotatably mounted in suitable bearing means such as that shown at 132 and 134 to allow the valve plate to rotate readily in the head.

Within the housing, constructed as described above, the rotor 12 is positioned for rotation between the valve plate 86 and spacer ring 18. The rotor is of substantial smaller external diameter than the internal diameter of the ring gear 16, and is provided with external teeth 30 for intermeshing engagement with the internal teeth of ring gear 16. The rotor having less number of teeth than that of the ring gear.

A crescent shaped member or vane 32 is located between the rotor 12 and the ring gear 16, having slidable sealing contact with the external teeth of rotor 12, the internal teeth of ring gear 16, and spacer ring 18 and sealing contact with valve plate 86, to form accurate chambers or compartments as shown by 34 within the ring gear 16.

The rotor 12 has a central bearing lug 74 extending longitudinally therefrom, which is extended into an off-centered opening 72 in the valve element or plate 86. Suitable bearing means, such as the bushing 84 is provided for the bearing lug 74 in the opening 72.

It will be apparent that due to the off-center or eccentric positioning of the bearing lug 74 of the rotor 12 in the valve plate 86, the rotor will be caused to move orbitally about the interior of the ring gear 16 with the teeth 30 of the rotor in intermeshing engagement with the internal teeth of the ring gear, so that the rotor will rotate on its axis during such orbital movement.

The rotor 12 has a central, end recess 36 which is internally toothed, as shown at 76, and into which one end of a wobble shaft 78 is extended, which is provided with a rounded externally toothed enlargement 80 whose teeth are in intermeshing engagement with the teeth 76 to rotate the shaft with the rotor.

The wobble shaft is also provided at its other end with a rounded, externally toothed enlargement 82 which is extended into a central end recess 56 in the inner end of a drive shaft 58 rotatably mounted in the housing. The recess 56 has internal gear teeth, as shown at 60, for intermeshing engagement with the teeth 82 to cause the shaft 58 to rotate with the wobble shaft.

Shaft 58 is formed with an external, annular enlargement 62 which is positioned within a counterbore 64 in the bearing block 20, in which suitable bearing means, such as those indicated at 66 and 68 are positioned on each side of the enlargement 62, to rotatably connect the drive shaft to the housing. The shaft 58 and bearings 66, 68, are retained in place by the mounting plate 22, surrounding the shaft and provided with suitable seal forming means, such as shown at 70, positioned to prevent leakage from the housing about the shaft.

As the rotor rotates the valve plate 86 and crescent member 32 will be rotated therewith, and due to the off-center mounting of the rotor in the valve plate the rotor will move in an orbital path with the external teeth 30 thereof in intermeshing engagement with the internal teeth of the ring gear 16. During such rotational and orbital movement of the rotor the wobble shaft 78 will be rotated by the intermeshing engagement of the external teeth 80 thereof with the internal teeth 76 of the rotor and such rotation will be thereby transmitted to the drive shaft 58 through the external teeth 82 of the wobble shaft 78 in intermeshing engagement with the internal teeth 60 of the drive shaft.

It will be apparent that each time the valve plate 86 makes one revolution and rotor 12 makes one orbit, the rotor will rotate a limited number of degrees. The amount of rotational movement of the rotor during each revolution of the valve plate will depend upon the gear ratio between the internal teeth on ring gear 16 and the external gear teeth 30 of the rotor. Thus, for example, when ring gear 16 has 30 internal teeth and the rotor is provided with 24 external gear teeth, the rotor will rotate six teeth, or one-fourth revolution for each revolution of the valve plate. Crescent member or vane 32 will make one revolution for each revolution of the valve plate, thus representing a relative rapid transfer of fluid from the one of compartments 34 to the other of compartments 34 for each revolution of the rotor 12, and thus representing a relative high torque at low operating speed of the motor.

It will be apparent that the motor may be reversed by suitably reversing the flow of fluid through the connections 46, and that the apparatus may also be used as a pump by rotating the drive shaft 58 while maintaining the connections 46 open to permit the circulation of fluid through the chambers 34 as the rotor is rotated.

It will further be apparent that shaft 58 may be held stationary and the rotation received from or transmitted to the housing 10, or the valve plate 86, or several different drive methods may be employed to rotate, or receive rotation from, rotor 12. The principal functional characteristics will be the same in either case, and the necessary mechanical arrangements will be obvious to those skilled in the art.

It will be evident that, if desired the crescent member or vane 32 may be constructed as a part of valve plate 26, as its rotation coincides with that of valve plate 26.

The fluid distributing mechanism is comprised of an annular inner valve plate 86 and an annular outer valve or flow control plate 88. Valve plate 86 is centrally rotatably mounted within the valve head 14 by means such as a bushing as shown at 132, and rotatably connected to the bearing lug 74 of rotor 12. Vane 32 is attached to valve plate 86 as a portion thereof. Flow control plate 88 is rotatably mounted centrally within the valve head 14, adjacent to plate 86, by means such as bushing 134.

A control shaft, as shown at 90, is rotatably mounted centrally within an opening 92 in the head 14 of the housing. Shaft 90 has an enlarged portion 94 whose end contains external spline 96 in intermeshing engagement with internal spline 98 on flow control plate 88. A bearing as shown at 100 is positioned to rotatably connect the shaft to the housing. A seal means, such as that shown at 102 is positioned to prevent leakage from the housing about the shaft.

Figures 2, 3:
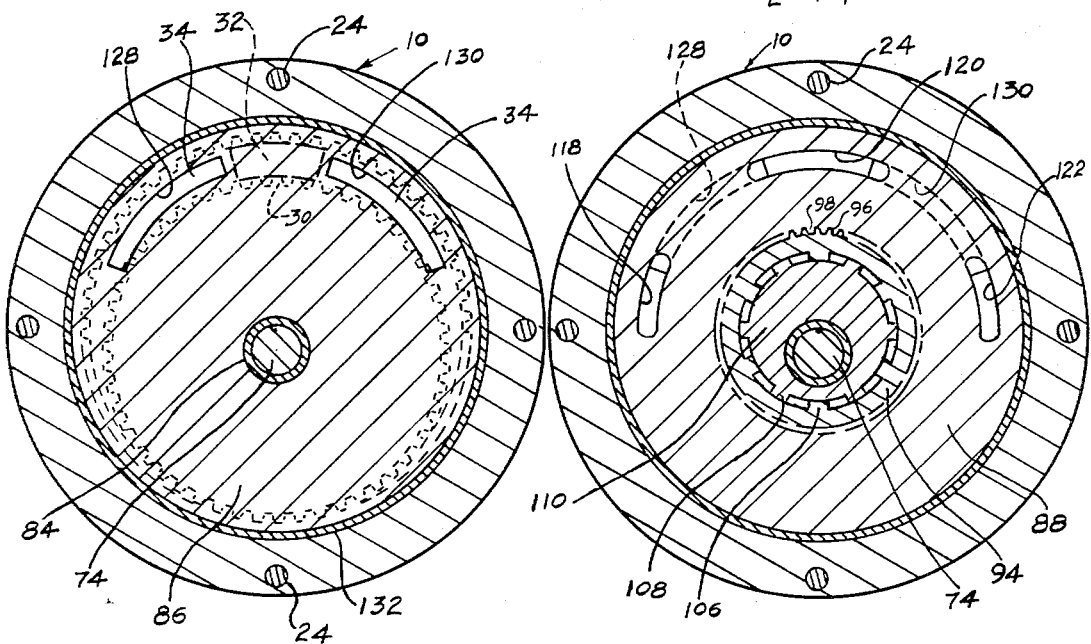
FIGURE 2 is a cross-sectional view, taken along the line 2—2 of FIGURE 1, looking in the direction indicated by the arrows.
FIGURE 3 is a cross-sectional view, taken along the line 3—3 of FIGURE 1, looking in the direction indicated by the arrows.
Figure 4:
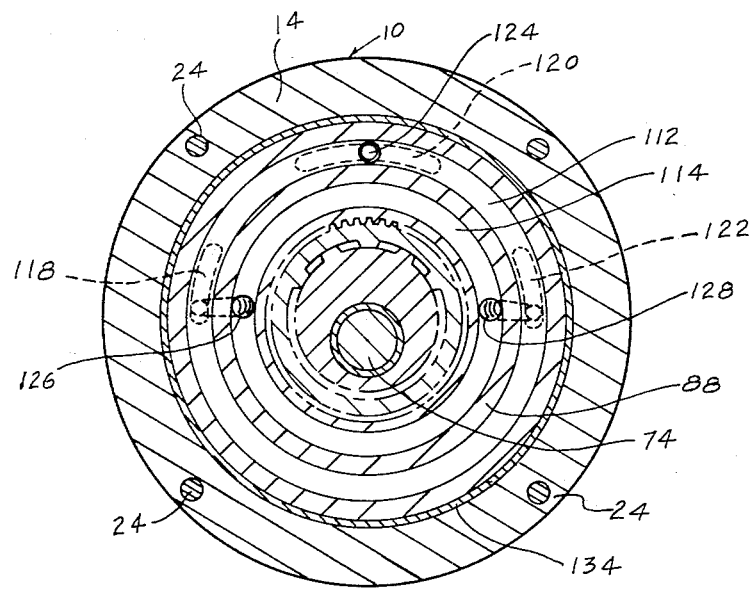
FIGURE 4 is a cross-sectional view, taken along the line 4—4 of FIGURE 1, looking in the direction indicated by the arrows.

A counterbore 104 is provided in the inner face of shaft 90 which contains an internal spline as shown at 106 which is in moveable meshing engagement with matching external spline 108 on central projection 110 of inner valve plate 86. External spline 108 and internal spline 106 are of special form whereby the splines are spaced unevenly apart thereby allowing relative movement of a limited degree between inner valve plate 86 and control shaft 90 as best seen in FIGURE 3.

Flow control plate 88 has in its outer face, radially spaced, concentric grooves 112 and 114, which are in communication respectively with the passageway 42 and 44 formed in the head 14, groove 112 is in communication, through passageway 124, with concentric arcuate part 120 of semicircular extent in the inner face of plate 88. Groove 114 is in communication respectively through passageways 126 and 128 with concentric, arcuate ports 118 and 122 of semicircular extent in the inner face of plate 88. Inner valve plate 86 contains concentric, arcuate ports 128 and 130 of semicircular extent which are in communication with pressure chambers 34. Port 128 of plate 86 is positioned for communication with ports 118 and 120 in plate 88, or for separate communication with either port 118 or port 120 as best seen in FIGURE 3. Port 130 of plate 86 is positioned for communication with ports 120 and 122 in plate 88 or for separate communication with either port 120 or port 122. The alignment of ports 118, 128, 120, 130, and 122 determining communication therebetween is controllable, through rotational movement of shaft 90 thereby effecting movement of valve plate 88 relative to plate 86. External spline 108 on projection 110 of plate 86 and internal spline 106 of shaft 90 being so constructed to allow limited rotational relative movement therebetween.

In the operation of the apparatus, constructed as described above, fluid under pressure, such as hydraulic fluid from a suitable source is admitted to the apparatus through the passageway 42, for example, while allowing fluid to be exhausted therefrom through passageway 44. The entering fluid flows into groove 112 and passes through passageway 124 into the arcuate port 120. The fluid is subsequently directed from port 120 into groove 128 and groove 130, or into groove 128, or into groove 130 as so directed by controlled rotation of shaft 90.

When control shaft 90 is stationary, rotationwise, the entering fluid will flow from port 120 into port 128 and 130 of plate 86, into chambers 34, from chambers 34 back through ports 128 and 130 and then be exhausted through ports 118 and 122 of plate 88, ducts 126 and 128 of plate 88, and duct 44. Therewith maintaining rotor 12 in a relatively stationary position.

Rotation of shaft 90 will close port 120 from communication with either port 130 or port 128. When shaft 90 is rotated to close port 120 from communication with port 130, the pressure fluid will flow thru port 128 into pressure chamber 34 and thus apply pressure to rotate rotor 12. With port 120 in this position, port 118 will be in sealing contact with plate 86 and port 122 will be in communication with the other of chambers 34 thru port 130, to allow exhaust therefrom of the fluid which is transferred past crescent member 32 as the rotor rotates. Rotation of the rotor is transmitted to drive shaft 58 as prior described. When shaft 90 ceases rotation, port 128 and 130 will again come into communication with port 120 due to rotation of rotor 12, thereby stopping rotation therewith of rotor 12. Rotor 12 will likewise be rotated in the opposite direction when port 120 is rotated in the opposition direction to close port 120 from communication with port 128. In this example, port 122 will be sealed by plate 86, thereby causing the pressurized fluid to enter pressure chamber 34 through port 130 and apply pressure to rotate the rotor while allowing fluid to be exhausted from the other of chambers 34 through port 128, port 118, duct 126, circular groove 114 and duct 44.

When there is no fluid pressure applied to the device, shaft 90 can rotate freely only a limited number of degrees, as designated by the relative movement between external spline 108 of projection 110 and internal spline 106 of shaft 90, then rotor 12 will be rotated by the eccentric location of projection 74 in plate 86.

Drive shaft 58 will therewith rotate simultaneously with the rotation of shaft 90 as described above, in either direction as designated by the direction of rotation of shaft 90, stopping and starting as shaft 90 stops and starts, and with or without fluid pressure application, therewith providing a fluid pressure device for application in vehicular power steering systems or the like.

It will thus be seen that the invention, constructed and operated as described above provides pressure fluid apparatus of compact design which is operable to deliver relatively high torque at low speed, which may be operated at widely varying speeds, and which may be used as a speed reducing or as a speed increasing device, and which may be applicable in vehicular steering systems or the like.

The invention is disclosed herein in connection with certain specific embodiments of the same, which it will be understood are intended by way of example only, it being obvious that various changes can be made in the construction and arrangement of the parts, within the spirit of the invention and scope of the appended claims.

Having thus clearly shown and described the invention, what is claimed as new and desired to secure by Letters Patent is:

1. Pressure fluid apparatus comprising, a housing, a rotor in the housing, means mounting the rotor for rotation on an axis disposed eccentrically relative to and for orbital movement about the axis of the housing, gear means on the rotor and housing positioned for coaction to cause the rotor to rotate in response to such orbital movement, rotatably movable vane means located between the housing and rotor positioned for coaction with the rotor, means in the housing positioned to form with the vane means compartments between the rotor and housing whose volume is conveyed by toothed means from one of said compartments to another of said compartments in response to such orbital movement, means for introducing pressure fluid into and exhausting the same from said compartments including valve means comprised of a pair of rotatable co-operating valve plates having limited relative movement therebetween, one of said valve plates rotatably connected to the rotor for movement in response to rotational movement of the rotor to control the inflow of such fluid into and the outflow of the same from the compartments at locations to cause the rotor to rotate, the other of said valve plates drivingly connected to a control shaft and workably positioned with first of said valve plates to control the inflow of such fluid into and the outflow of the same from said first valve plate to impart rotation to the rotor in response to rotation of said control shaft, a member rotatably mounted on the housing for rotation on an axis concentric therewith and means forming a driving connection between the rotor and member to cause the member, rotor, and control shaft to rotate simultaneously.

2. Pressure fluid apparatus comprising, a housing, a rotor in the housing, means mounting the rotor for rotation on an axis disposed eccentrically relative to and for orbital movement about the axis of the housing, gear means on the rotor and housing positioned for co-action to cause the rotor to rotate in response to such orbital movement, means forming fluid compartments between the housing and rotor positioned for rotation with the rotor to effect rotor movement in response to the flow of fluid through said fluid compartments, means for introducing pressure fluid into and exhausting the same from said compartments including valve means comprised of a pair of rotatable cooperating valve plates having limited relative movements therebetween, one of said valve plates rotatably connected to the rotor for movement in response to rotational movement of the rotor to control the inflow of such fluid into and the outflow of the same from the compartments at locations to cause the rotor to rotate, the other of said valve plates drivingly connected to a control shaft and workably positioned with first of said valve plates to control the inflow of such fluid into and the outflow of the same from said first valve plate to impart rotation to the rotor in response to rotation of the control shaft, a member rotatably mounted on the housing for rotation on an axis concentric therewith and means forming a driving connection between the rotor nad member to cause the member, rotor, and control shaft to rotate simultaneously.

3. Pressure fluid apparatus comprising, a housing, a rotor in the housing, means mounting the rotor for rotation on an axis disposed eccentrically relative to and for orbital movement about the axis of the housing, gear means on the rotor and housing positioned for co-action to cause the rotor to rotate in response to such orbital movement, means forming fluid compartments between the housing and rotor to effect rotor movement in response to the flow of fluid through said fluid compartments, means for introducing pressure fluid into and exhausting the same from said compartments including valve means comprised of a pair of rotatable cooperating valve plates having limited relative movement therebetween, one of said valve plates rotatably connected to the rotor for movement in response to rotational movement of the rotor to control the inflow of such fluid into and the outflow of the same from the compartments at locations to cause the rotor to rotate, the other of said valve plates drivingly connected to a control shaft and workably positioned with first of said valve plates to control the inflow of such fluid into and the outflow of the same from said first valve plate to impart rotation to the rotor in response to rotation of the control shaft, a member rotatably mounted on the housing for rotation on an axis concentric therewith and means forming a driving connection between the rotor and member to cause the member, rotor, and control shaft to rotate simultaneously.

References Cited
UNITED STATES PATENTS

| | | | |
|---|---|---|---|
| 2,351,732 | 6/1944 | Almond | 137—624.21 |
| Re. 25,291 | 12/1962 | Charlson | 91—56 |
| 1,389,189 | 8/1921 | Feuerheerd | 103—130 |
| 2,132,812 | 10/1938 | Wahlmark | 103—130 X |
| 2,787,963 | 4/1957 | Dolan | 103—126 |
| 2,905,094 | 9/1959 | Gerteis | 103—126 X |
| 3,270,681 | 9/1966 | Charlson | 103—130 |
| 3,289,542 | 12/1966 | Fikse | 103—130 X |
| 3,289,601 | 12/1966 | Compton | 103—130 |

MARTIN P. SCHWADRON, *Primary Examiner.*

G. N. BAUM, *Assistant Examiner.*